United States Patent [19]
Abe et al.

[11] Patent Number: 5,640,849
[45] Date of Patent: Jun. 24, 1997

[54] STATOR ASSEMBLY FOR A FLUID TORQUE CONVERTER

[75] Inventors: Hiroya Abe; Toru Yamashita, both of Saitama-ken, Japan

[73] Assignee: Honda Giken Kogyo Kabushiki Kaisha, Tokyo, Japan

[21] Appl. No.: 456,940

[22] Filed: Jun. 1, 1995

[30] Foreign Application Priority Data

Jun. 16, 1994 [JP] Japan ................... 6-159443

[51] Int. Cl.⁶ ................................. F16D 33/00
[52] U.S. Cl. ............................. 60/362; 60/361
[58] Field of Search ............. 60/330, 361, 362

[56] References Cited

U.S. PATENT DOCUMENTS 3,855,790  12/1974  Rist ........................... 60/361

FOREIGN PATENT DOCUMENTS 3-35359  4/1991  Japan .
898031  6/1962  United Kingdom ............ 60/362

Primary Examiner—F. Daniel Lopez
Attorney, Agent, or Firm—Armstrong, Westerman, Hattori, McLeland & Naughton

[57] ABSTRACT

A fluid torque converter using a stator assembly adapted to be formed by a die assembly essentially consisting of two halves that can be separated apart in an axial direction when removing a formed stator assembly, a part of an inner circumferential surface of the core ring adjacent to a pressure surface of each of the stator blades is provided with a bulge. Owing to the bulges provided in the inner circumferential surface of the core ring adjacent to the pressure surfaces of the stator blades, the annular fluid flow can be conducted in smooth fashion, and flow separation can be avoided. As a result, the efficiency of the torque converter and the power response of the automatic transmission system can be improved while the stator assembly can be fabricated at a low cost by using a die assembly which can be drawn apart in the axial direction.

2 Claims, 6 Drawing Sheets

STATOR ASSEMBLY FOR A FLUID TORQUE CONVERTER

BACKGROUND OF THE INVENTION

1. Field of the Invention

The present invention relates to a fluid torque converter for an automotive transmission system, and in particular to a novel stator assembly for such a fluid torque converter.

2. Background of the Invention

According to a conventional stator assembly of a fluid torque converter for an automotive transmission system, stator blades are integrally cast with an annular inner shell and a core ring to the end of simplifying the manufacturing process and reducing the manufacturing cost. An example of such a stator assembly is disclosed in Japanese utility model laid open publication (kokai) No. 3-35359. Typically, the die casting assembly consists of two halves which can be drawn apart or separated apart in the axial direction when removing the cast product. To make it possible, the adjacent blades do not overlap each other as seen from the axial direction, and the profile of the surfaces of the core ring and the inner shell facing the flow passage are linear in the axial direction. Because the stator blades have a certain attack angle with respect to the axial direction, the circumferential surface of the core ring or the inner shell is required not to interfere with the parts of the die assembly which form the profile of the stator blades. If the core ring or the inner shell is contoured, for instance with a lens-shaped cross section, it is impossible to draw apart the two halves of the die assembly in the axial direction.

In a fluid torque converter of this type, particularly in a stall condition or when the speed ratio (turbine rpm/pump rpm) e=0, the flow velocity of the circulating fluid is relatively high, and the inflow angle with respect to the stator blade (refer to numeral 21 of FIG. 6) is relatively large as indicated by arrow B in FIG. 6. Further, when the three dimensional flow pattern of the circulating fluid is considered, it curves around the core ring 22 as indicated by the imaginary line in FIG. 7. The inflow angle progressively diminishes with the increase in the speed ratio e, and the fluid flow eventually takes place in the direction indicated by dotted arrow C in FIG. 6. With further increase in the speed ratio e, the fluid flow is ultimately directed toward the rear surface of the stator blade 21 (which is opposite to the pressure surface of the stator blade 21 upon which the fluid flow normally impinges), and the torque amplifying property of the torque converter is lost.

Sometimes, a relatively thick airfoil profile is used for the stator blade, instead of a relatively thin blade profile which is characterized by a relatively uniform thickness over an entire base line thereof and commonly used for the pump and the turbine, so that the fluid loss may be reduced over such a wide range of the inflow angle. However, because the inner circumferential surface of the core ring 22 is not smoothly curved along the axial direction as opposed to the pump and the turbine, the axial fluid flow curving around the core ring 22 tends to be separated from the inner circumferential surface of the core ring 22 as indicated by arrows in FIG. 8, and this substantially increases the fluid loss. As a result, the torque ratio tends to drop sharply near the stall point involving a relatively high fluid flow velocity.

BRIEF SUMMARY OF THE INVENTION

In view of such problems of the prior art, a primary object of the present invention is to provide a stator assembly for a fluid torque converter which can improve the torque ratio in a stall condition without complicating the manufacturing process.

A second object of the present invention is to provide a stator assembly for a fluid torque converter which can improve the power response when applied to an automotive transmission system.

A third object of the present invention is to provide a stator assembly for a fluid torque converter which can improve the general performance thereof but is suited to be cast by using a die assembly adapted to be separated apart in the axial direction.

These and other objects of the present invention can be accomplished by providing a stator assembly for a fluid torque converter including a pump impeller, a turbine, and a stator assembly, the stator assembly being adapted to be formed by a die assembly essentially consisting of two halves that can be separated apart in an axial direction when removing a formed stator assembly, comprising: an inner annular shell disposed coaxially with a common axial line of rotation of the pump impeller and the stator assembly; a plurality of stator blades extending radially from an outer circumferential surface of the inner annular shell; and a core ring joining outer ends of the stator blades and disposed coaxially with the inner annular shell; a part of an inner circumferential surface of the core ring adjacent to a pressure surface of each of the stator blades being provided with a bulge.

Thus, the stator assembly can be fabricated at a low cost by using a die assembly which can be drawn apart in the axial direction, but because of the bulges provided in the inner circumferential surface of the core ring adjacent to the pressure surfaces of the stator blades the annular fluid flow can be conducted in smooth fashion, and flow separation can be avoided. As a result, the efficiency of the torque converter and the power response of the automatic transmission system can be improved.

According to a preferred embodiment of the present invention, the bulge has a cross-section which increases in the axial direction from a first end facing the turbine to a second end facing the pump impeller so that the advantage of the present invention can be maximized. In terms of simplifying the design and fabrication of the die assembly for fabricating the stator assembly, the bulge consists of a part-spherical part facing the turbine and a part-cylindrical part continuously and axially extending from the part-spherical part to the pressure surface of an associated one of the stator blades.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
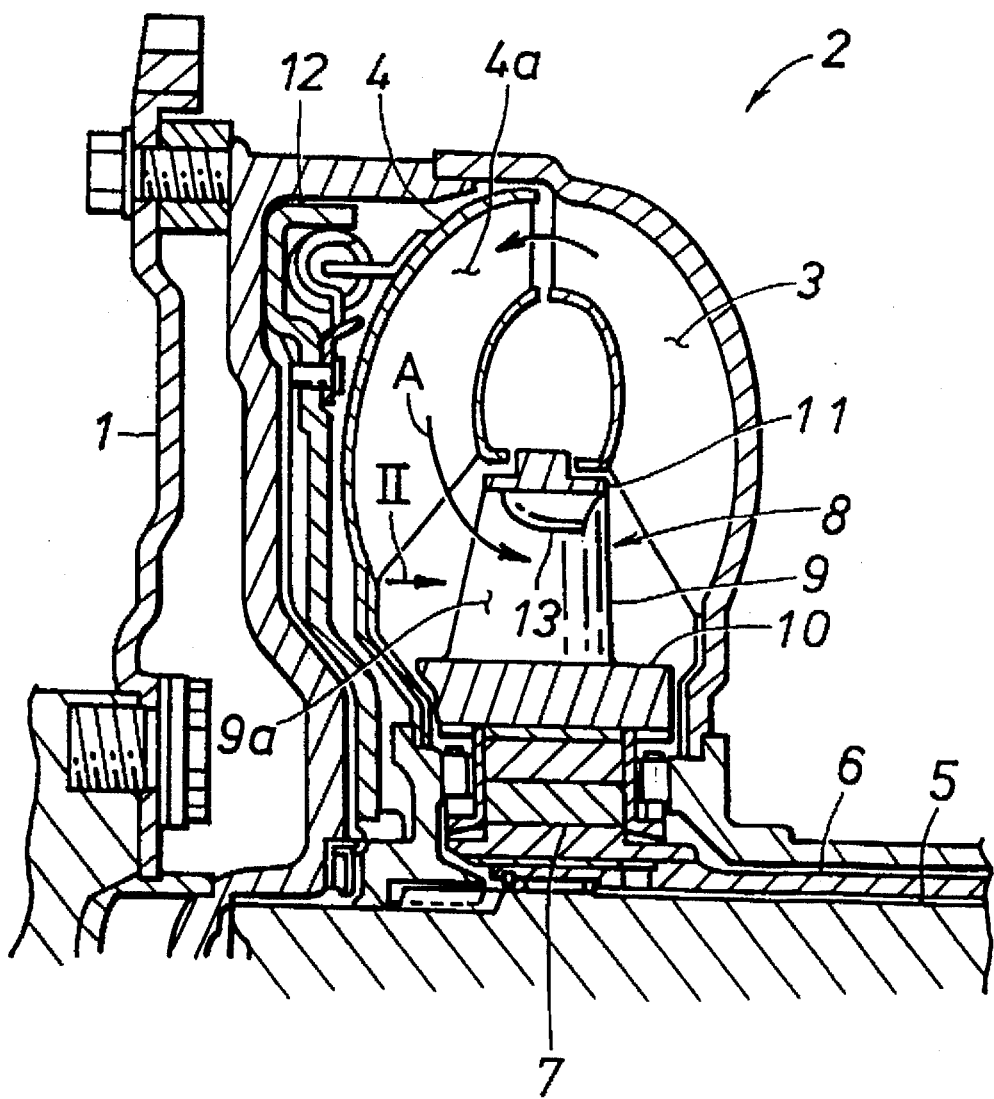
FIG. 1 is an fragmentary sectional side view of a fluid torque converter to which the present invention is applied.

Referring to FIG. 1, a pump impeller 3 integrally formed with a torque converter housing 2 is integrally connected to a drive plate 1 which is in turn connected to an output shaft of an internal combustion engine (not shown) in the drawing. A turbine 4 comprising a plurality of turbine blades 4a is placed in the torque converter housing 2 opposite to the pump impeller 3, and is connected to a main shaft 5 of the torque converter in a torque transmitting relationship. The pump impeller 3 and the turbine 4 are thus rotatably arranged opposite each other in a coaxial relationship.

A stator shaft 6 is coaxially and rotatably fitted on the main shaft 5, and a stator assembly 8 provided with a plurality of stator blades 9 and disposed between the pump impeller 3 and the turbine 4 is coupled with the stator shaft 6 via a one-way clutch 7. In this torque converter, the turbine 4 is provided with a lock-up mechanism 12, and the circulating oil flows in an annular or toroidal pattern as indicated by arrow A.

Figure 2:
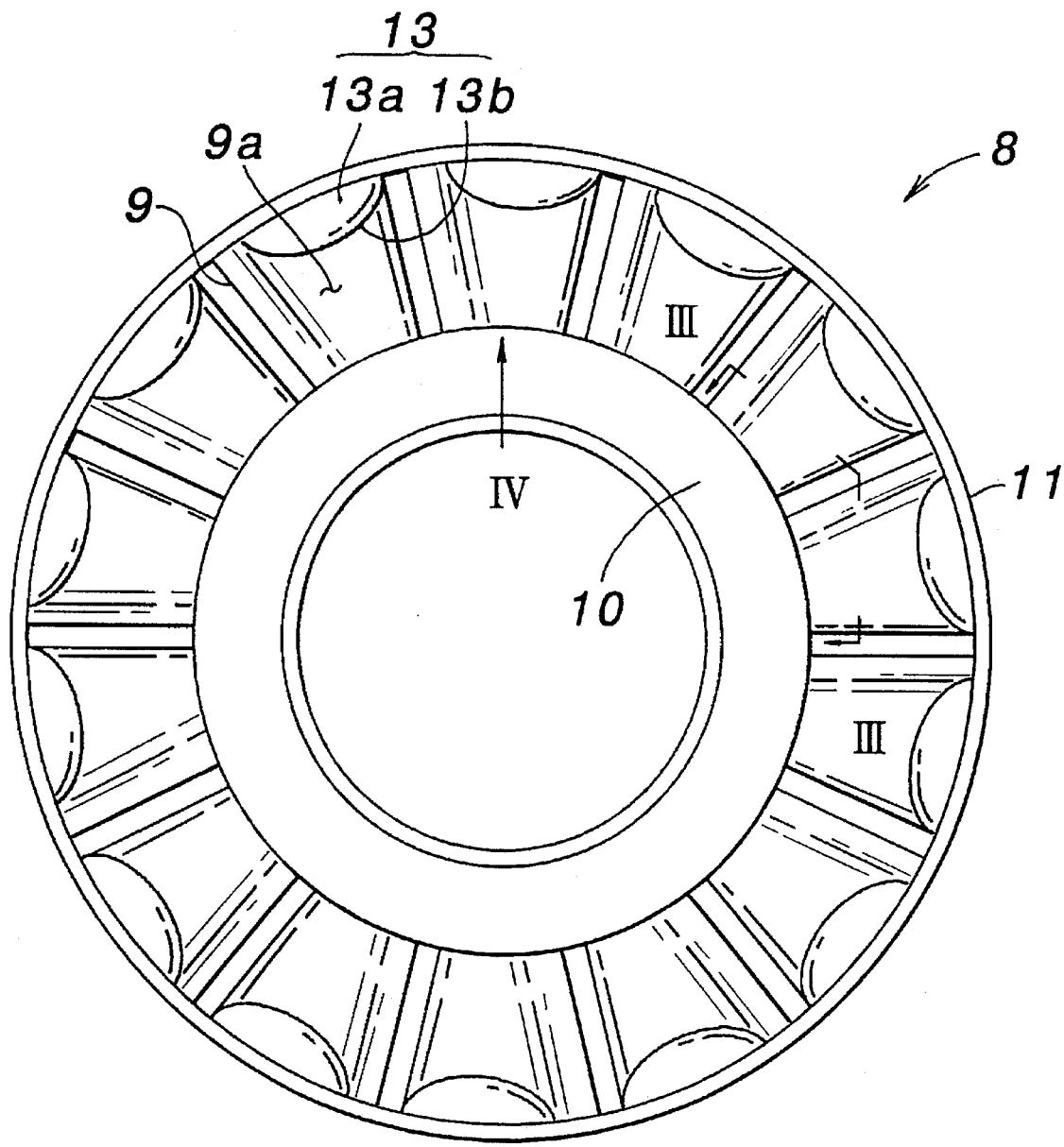
FIG. 2 is an end view as seen from the direction indicated by line II in FIG. 1.
Figure 3:
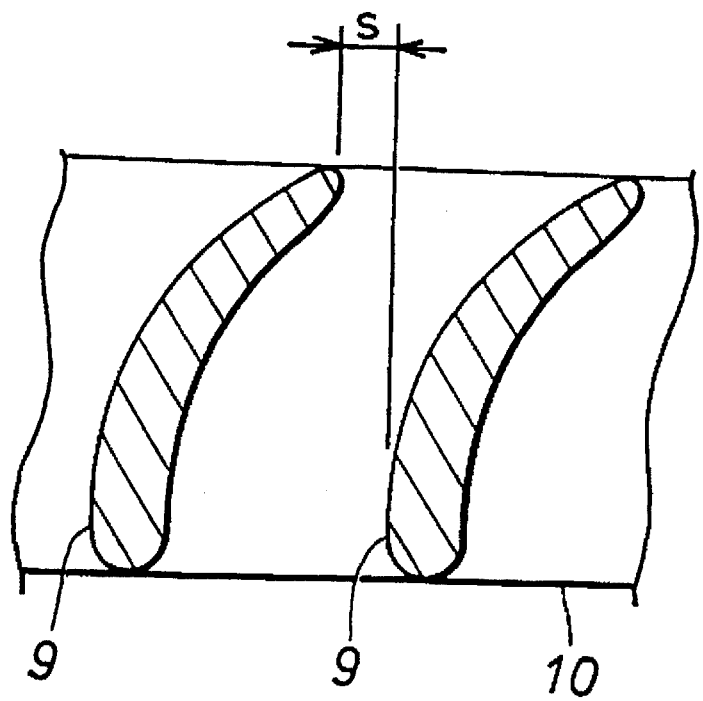
FIG. 3 is a sectional view taken along line III—III of FIG. 2.
Figure 4:
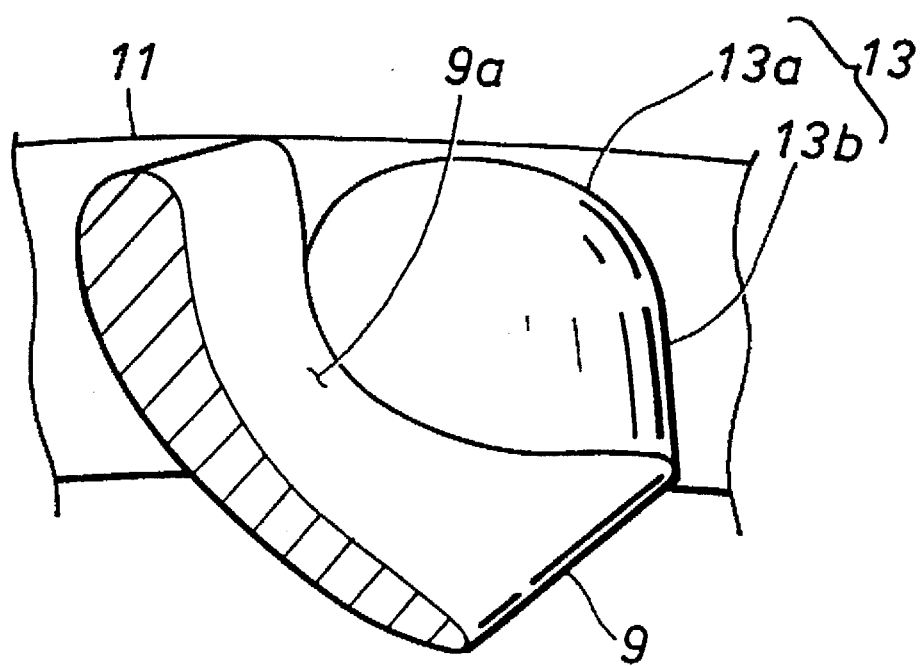
FIG. 4 is an enlarged fragmentary perspective view as seen from the direction indicated by line IV in FIG. 2.

Now the mode of operation of the stator assembly 8 according to the present invention is described in the following with reference to FIGS. 2 to 4. This stator assembly 8 comprises an annular inner shell 10 surrounding the one-way clutch 7, and fourteen (14) stator blades 9 extending radially from the outer circumferential surface of the annular inner shell 10, and a core ring 11 integrally joining the outer ends of the blades 9 and disposed coaxially with the annular inner shell 10. This stator assembly 8 is adapted to be cast by a die assembly which can be drawn apart or separated in the axial direction. More specifically, the blades 9 are arranged so as to define a gap s between each adjacent pair as seen from the axial direction. Although the present embodiment is fabricated by casting, it is also possible to fabricate the stator assembly by forging or molding by appropriately selecting the material.

The part of the inner circumferential surface of the core ring 11 adjacent to each of the stator blades 9 is provided with a bulge 13 projecting radially inwardly. Each of the bulges 13 extends axially substantially across the inner circumferential surface of the core ring 11 from one of the axial edges of the core ring 11 facing the turbine 4 to the other axial edge facing the pump impeller 3. This bulge 13 is generally part-cylindrical in shape, and the first axial end 13a of the bulge 13 facing the turbine 4 is part-spherical while the second axial end 13b merges with the pressure surface 9a of the blade 9 or the concave surface of the blade 9. The bulge 13 may be semi-cylindrical in shape, but is generally in the shape of a smaller section of a full cylinder cut apart by a plane extending in parallel with and offset from the central axial line of the cylinder.

Therefore, as seen from the turbine 4, the bulge 13 presents a part-spherical surface, and its cross-sectional area gradually increases from the turbine end thereof, eventually merging with the blade 9a after defining a part-cylindrical contour as described above. The profile of the bulge is not limited to the above described embodiment, but may be modified into any smooth contours as long as they allow to be fabricated by using a die assembly that is adapted to be axially drawn apart, and its cross-sectional area increases from the turbine end to the blade end or the pump end in a smooth fashion.

Figure 5:
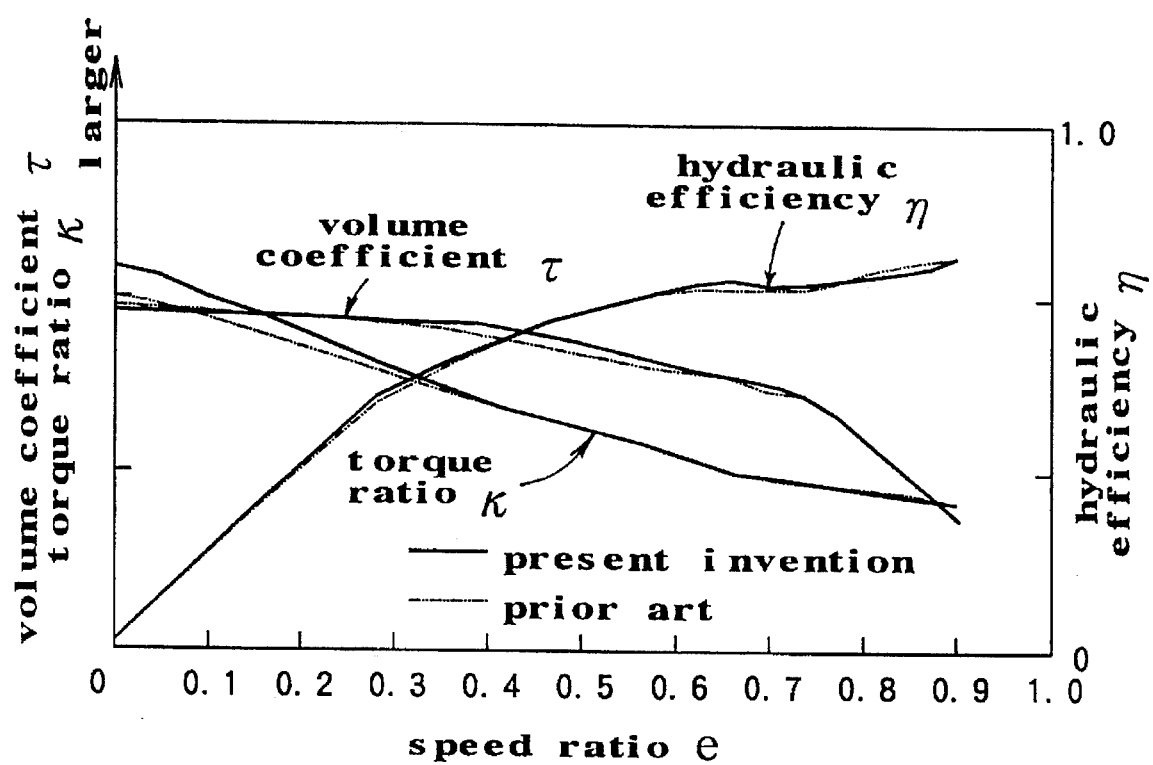
FIG. 5 is a graph comparing various properties of the conventional stator assembly and the stator assembly according to the present invention.
Figure 6:
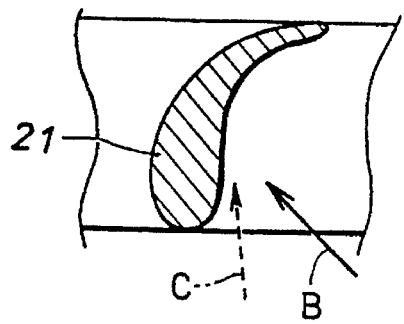
FIG. 6 is a fragmentary sectional view showing the flow of the circulating fluid in relation with one of the stator blades.
Figure 7:
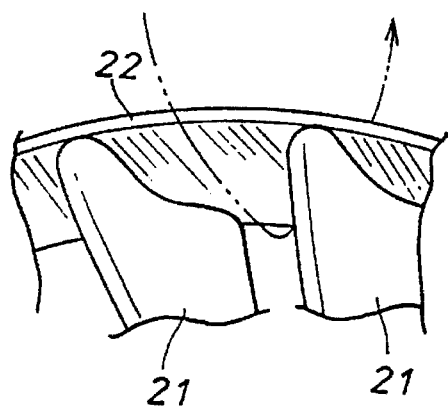
FIG. 7 is a fragmentary perspective view showing the three dimensional flow of the circulating fluid in relation with the stator assembly.
Figure 8:
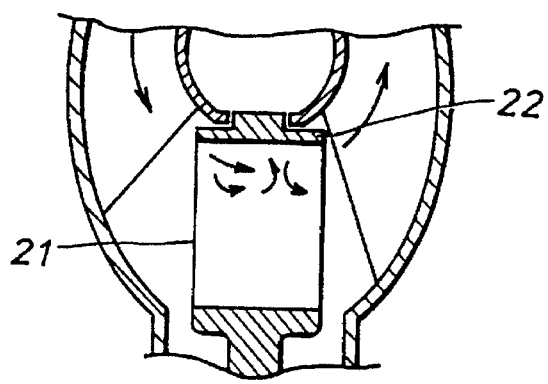
FIG. 8 a fragmentary sectional side showing the fluid flow in relation with the conventional stator assembly.

According to the torque converter making use of such a stator assembly, because of the smooth contour of each of the bulges defined by a part-spherical section and a part-cylindrical section, the circulating fluid can flow along the inner circumferential surface of the core ring 11 without encountering any sharp edges, and can flow in the toroidal pattern in a highly smooth fashion without involving any significant flow separation. FIG. 5 compares the properties of two torque converters which are identical to each other except that one of them uses the stator assembly of the present invention while the other torque converter uses the conventional stator assembly. The graph of FIG. 5 shows the changes in the volume coefficient (pump absorbing torque) $\tau$, hydraulic efficiency $\eta$ and torque ratio $\kappa$ with the change in the speed ratio e, and the solid curves correspond to the present invention while the double-chain-dot curves correspond the prior art. As shown in FIG. 5, the present invention can improve the torque ratio $\kappa$ in the stall condition by more than 10%, and this makes a significant change in the accelerating performance of the vehicle.

Thus, according to the present invention, the annular fluid flow passing through the stator assembly can be achieved in a smooth fashion owing to the provision of the bulges having a smooth contour. Flow separation can be avoided, and the hydraulic efficiency of the torque converter and the torque ratio in a stall condition which is important in the accelerating performance can be improved. Furthermore, this stator assembly can be fabricated by using a die assembly which can be drawn apart in the axial direction. The bulges are formed by the section of the die assembly which forms the pressure surface of each of the blades.

What we claim is:

1. A stator assembly for a fluid torque converter including a pump impeller, a turbine, and a stator assembly, said stator assembly being adapted to be formed by a die assembly essentially consisting of two halves that can be separated apart in an axial direction when removing a formed stator assembly, comprising:

an inner annular shell disposed coaxially with a common axial line of rotation of said pump impeller and said stator assembly;

a plurality of stator blades extending radially from an outer circumferential surface of said inner annular shell; and a core ring joining outer ends of said stator blades and disposed coaxially with said inner annular shell;

a part of an inner circumferential surface of said core ring adjacent a pressure surface of each of said stator blades being provided with a bulge having a cross-section which increases in an axial direction from a first end facing said turbine to a second end facing said pump impeller.

2. A stator assembly for a fluid torque converter according to claim 1, wherein said bulge consists of a part-spherical part facing said turbine and a part-cylindrical part continuously and axially extending from said part-spherical part to said pressure surface of an associated one of said stator blades.

* * * * *